United States Patent

Tanaka et al.

[11] Patent Number: 5,529,160
[45] Date of Patent: Jun. 25, 1996

[54] CLUTCH DRUM MADE OF METALLIC PLATE AND METHOD OF MANUFACTURING SAME

[75] Inventors: Haruo Tanaka; Toshiki Takeda; Yoichi Kojima; Yoshihiro Kodama, all of Sayama, Japan

[73] Assignee: Honda Giken Kogyo Kabushiki Kaisha, Tokyo, Japan

[21] Appl. No.: 357,388

[22] Filed: Dec. 16, 1994

[30] Foreign Application Priority Data

Dec. 22, 1993 [JP] Japan .................. 5-325361

[51] Int. Cl.$^6$ ........................................ F16D 13/58
[52] U.S. Cl. ............................ 192/70.2; 74/434
[58] Field of Search ................ 192/70.2, 70.19, 192/85 AA; 74/434, 437, 449

[56] References Cited

U.S. PATENT DOCUMENTS

| | | |
|---|---|---|
| 4,566,571 | 1/1986 | Fujioka . |
| 4,705,150 | 11/1987 | Hill ........................ 192/70.2 |
| 5,078,536 | 1/1992 | Anderson ............. 192/70.2 X |
| 5,388,474 | 2/1995 | Tanaka et al. ........ 192/70.2 X |

FOREIGN PATENT DOCUMENTS

| | | | |
|---|---|---|---|
| 54-16060 | 2/1979 | Japan | 192/70.2 |
| 62-141318 | 6/1987 | Japan | 192/70.2 |
| 1-35123 | 2/1989 | Japan | 192/70.2 |
| 3-288018 | 12/1991 | Japan | 192/70.2 |
| 6-17840 | 1/1994 | Japan | 192/70.2 |

*Primary Examiner*—Andrea L. Pitts
*Attorney, Agent, or Firm*—Armstrong, Westerman Hattori, McLeland & Naughton

[57] ABSTRACT

A clutch drum made of a metallic plate having on its peripheral wall portion spline teeth for engaging with clutch plates is formed by pressing with a die which has formed tooth grooves on its periphery and tooth-shaped punches which are disposed around the die so as to move radially back and forth. The force of pressurizing the toothed punches against the tooth flank portions of the spline teeth is made smaller at an open end thereof than at an ordinary portion of the clutch drum such that the thickness of the flank portions of the spline teeth becomes thicker at the open end than at the ordinary portion.

1 Claim, 2 Drawing Sheets

CLUTCH DRUM MADE OF METALLIC PLATE AND METHOD OF MANUFACTURING SAME

BACKGROUND OF THE INVENTION

1. Field of the Invention

The present invention relates to a clutch drum which is made of a metallic plate and which is formed by pressing in the peripheral wall portion thereof spline teeth which are engaged with clutch plates, as well as to a method of manufacturing the above-described clutch drum.

2. Description of Related Art

In manufacturing this kind of clutch drum, the following steps have conventionally been followed. Namely, a cup-shaped raw material made of a metallic plate is set by fitting it onto an external surface of a die which has peripheral tooth grooves or spaces corresponding to spline teeth. The peripheral wall of the cup-shaped raw material is pushed or urged by tooth-shaped punches which are disposed around the die and which can be radially moved back and forth. The spline teeth are thereby formed by pressing.

In order to improve the forming accuracy of the spline teeth, it is necessary to strongly press or urge the side or flank portions of the spline teeth to thereby reduce the roll over or shear drop in the corner portions at the tooth top.

However, in this case, the wall thickness of the tooth flank portions will be reduced and, consequently, the clutch drum is likely to be cracked from an open end of the clutch drum under the influence of the centrifugal force at the time of high-speed rotation. The strength of the clutch drum consequently decreases.

In view of the above-described points, the present invention has an object of providing a clutch drum made of a metallic plate which has an improved strength at the time of high-speed rotation.

SUMMARY OF THE INVENTION

In order to attain the above-described and other objects, the present invention is a clutch drum made of a metallic plate, the clutch drum having on a peripheral wall portion thereof spline teeth formed by pressing for engaging clutch plates therewith, wherein the thickness of tooth flank portions of the spline teeth is made thicker at an open end than at an ordinary portion of the peripheral wall near an end wall of the clutch drum. The peripheral wall extends out from the end wall of the clutch drum. The spline teeth are formed by pressing by using a die having formed tooth grooves on a periphery thereof and tooth-shaped punches which are disposed around the die and which can be moved radially back and forth. On the occasion of this forming by pressing, the toothed punches are strongly pressurized against the tooth flank portions at the ordinary porion of the clutch drum to thereby improve the forming accuracy of the spline teeth. On the other hand, at the open end of the clutch drum, the force of pressurizing the toothed punches against the tooth flank portions is weakened to thereby prevent the thickness of the tooth flank portions from decreasing too much. According to this arrangement, the thickness of the tooth flank portions becomes thicker at the open end than at the ordinary portion near the end wall of the clutch drum. Therefore, the strength of the open end against the centrifugal force due to rotation becomes high.

In this case, though the forming accuracy of the spline teeth on the side of the open end becomes poor, there will be no problem as long as there is attained an accuracy which is enough to move the clutch plates into and out of the clutch drum.

In order to weaken the force of pressurizing the toothed punches against the tooth flank portions of the spline teeth at the open end of the clutch drum than at the ordinary portion near the end wall thereof, the width of the tooth top portions of the toothed punches may be made smaller at the portion which corresponds to the open end of the clutch drum.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
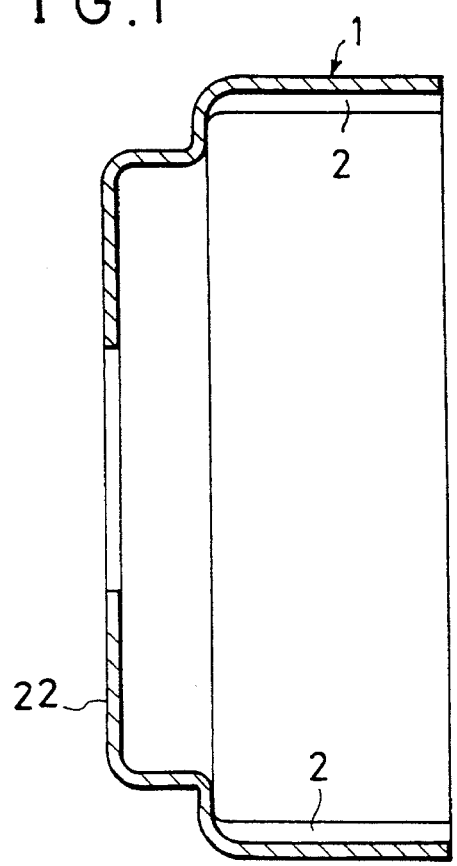
FIG. 1 is a sectional side view of one example of a clutch drum to which the present invention is applied.

Referring to FIG. 1, numeral 1 denotes that clutch drum made of a relatively thin metallic plate which constitutes a clutch outer member of a hydraulic clutch. Clutch plates are engaged with spline teeth 2 which are formed on the peripheral wall portion of the clutch drum 1.

Figure 2:
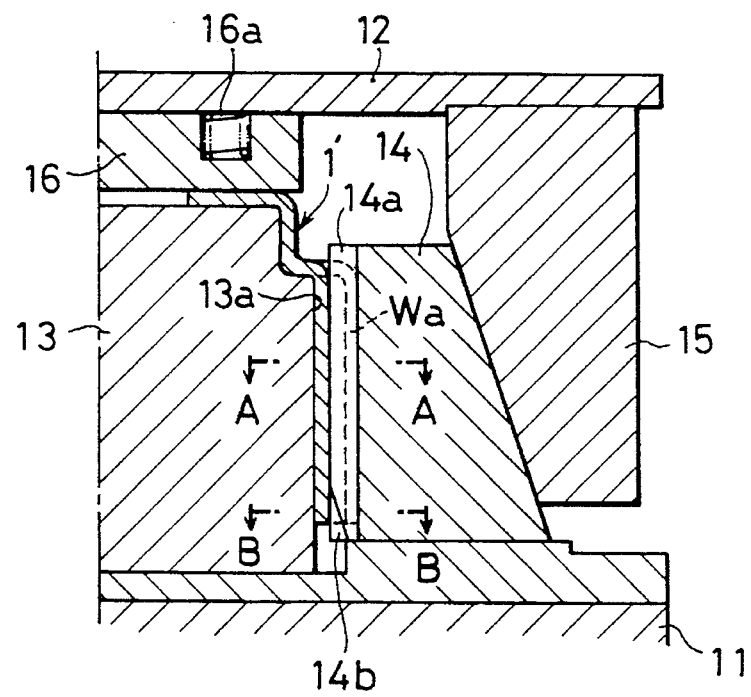
FIG. 2 is a sectional side view of an apparatus for forming the clutch drum.

This clutch drum 1 is formed by pressing with a forming apparatus as shown in FIG. 2. In more detail, the forming apparatus is provided with a lower frame 11 and an upper movable frame 12. On the lower frame 11, there are disposed a die 13 onto whose periphery a cup-shaped raw material 1' can be set by fitting it upside down, and a plurality of tooth-shaped or toothed punches 14 which are disposed around the die 13 and which can be radially moved back and forth. On the upper movable frame 12, on the other hand, there are disposed driving cams 15 which drive the toothed punches 14, and a pad 16 which holds the raw material 1' on the die 13 in a pinched manner and which is urged downwards by springs 16a.

On the peripheral surface of the die 13 there are formed a plurality of tooth grooves 13a which correspond to the spline teeth 2. By the downward movement of the upper movable frame 12, each of the toothed punches 14 are moved radially forwards, via the driving cams 15, towards each of the toothed grooves 13a. The peripheral wall of the raw material 1' is thus pushed into the toothed grooves 13a by means of the tooth crest or top portions 14a of the toothed punches 14, thereby forming by pressing the spline teeth 2.

Figure 3A:
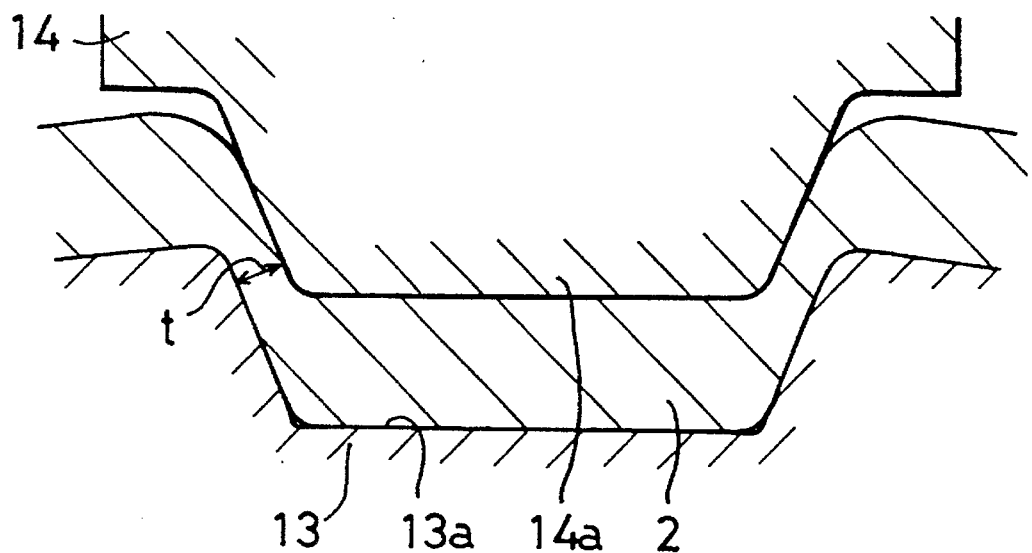
FIG. 3A is a sectional view taken along the line A—A in FIG. 2.

Here, those portions of the toothed punches 14 which correspond to the ordinary portion near end wall 22 of the clutch drum 1 are formed, as shown in FIG. 3A, in such a manner that the width of the tooth top portions 14a becomes wider. Therefore, the tooth flank or side portions of the spline teeth 2 are strongly pressurized. As a consequence, the metal or the material on the side of the tooth flank portions is urged or pushed towards the tooth top corner portions of the spline teeth 2, with the result that the roll over or shear drop becomes small and the forming accuracy of the spline teeth 2 can be improved.

Figure 3B:
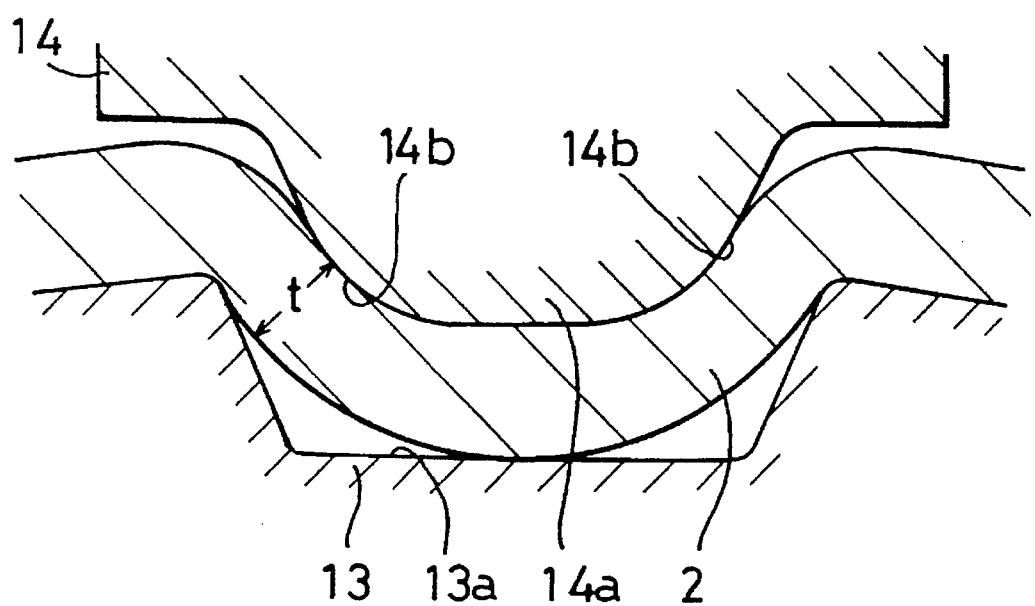
FIG. 3B is a sectional view taken along the line B—B in FIG. 2.

On the other hand, those portions of the toothed punches 14 which correspond to the open end of the clutch drum 1 are formed, as shown in FIG. 3B, in such a manner that the width of the tooth top portions 14a becomes narrower with a rounded portion 14b on each side thereof. As a consequence, the pressurizing force against the tooth flank portions of the spline teeth 2 is decreased, and the thickness t of the tooth flank portions becomes thicker at the open end than at the remaining ordinary portion of the clutch drum 1.

If the thickness t of the tooth flank portions at the open end of the clutch drum 1 is made thicker as described above, the strength of the open end against the centrifugal force due to rotation becomes high.

Upon measurement of the rotational strengths between a clutch drum according to the present invention whose spline teeth (tooth height 3.35 mm) were formed by pressing on a cup-shaped raw material of a relatively thin plate (thickness 2.3 mm, internal diameter 123.5 mm) as in the above-described example and a product for comparison made of the same raw material whose spline teeth were formed by pressing throughout the clutch drum up to the open end in the same shape as the one shown in FIG. 3A, it has been confirmed that an allowable rotational speed within which no cracks occur to the open end was an increase of as large as 13% to 22200 rpm as compared with 19700 rpm with the product for comparison.

In the above-described example, the present invention was applied to the clutch drum on the side of the clutch outer member. The present invention can also be applied to the clutch drum on the clutch inner member.

It is readily apparent that the above-described clutch drum and a method of manufacturing the same meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A clutch drum made of a metallic plate, said clutch drum comprising:

an end wall on one axial side thereof;

a peripheral wall extending from said end wall towards an open end on the opposite axial side thereof; and spline teeth formed on said peripheral wall by pressing for engagement with clutch plates, wherein the thickness of tooth flank portions of said spline teeth is greater at an open end portion of said peripheral wall near said open end than at the remaining portion of said peripheral wall.

* * * * *